United States Patent [19]

Bergmann et al.

[11] Patent Number: 4,738,393
[45] Date of Patent: Apr. 19, 1988

[54] MIXING VALVE ASSEMBLY

[75] Inventors: Konrad Bergmann, Wittlich; Bernd Loose, Traben-Trarbach; Klaus Läller, Meckenheim-Merl, all of Fed. Rep. of Germany

[73] Assignee: American Standard Inc., New York, N.Y.

[21] Appl. No.: 884,946

[22] Filed: Jul. 14, 1986

[51] Int. Cl.[4] .............................................. G05D 23/13
[52] U.S. Cl. ................... 236/12.16; 236/12.23
[58] Field of Search ............... 236/12.16, 12.23, 12.1

[56] References Cited

U.S. PATENT DOCUMENTS

| 4,349,149 | 9/1982 | Humpert | 236/12.16 |
| 4,381,073 | 4/1983 | Gloor | 236/12.15 |
| 4,407,444 | 10/1983 | Knebel et al. | 236/12.1 |
| 4,458,839 | 7/1984 | MacDonald | 236/12.16 |

Primary Examiner—William E. Tapolcai
Attorney, Agent, or Firm—James J. Salerno, Jr.; Robert G. Crooks; John P. Sinnott

[57] ABSTRACT

A sanitary mixing valve assembly, of the single handle type, which includes both a thermostatic control means to preset water temperature, and valving means to regulate volume flow between opened and closed positions, is disclosed. The thermostatic control means and valving means are arranged and constructed to form a unit within a replaceable cartridge.

22 Claims, 11 Drawing Sheets

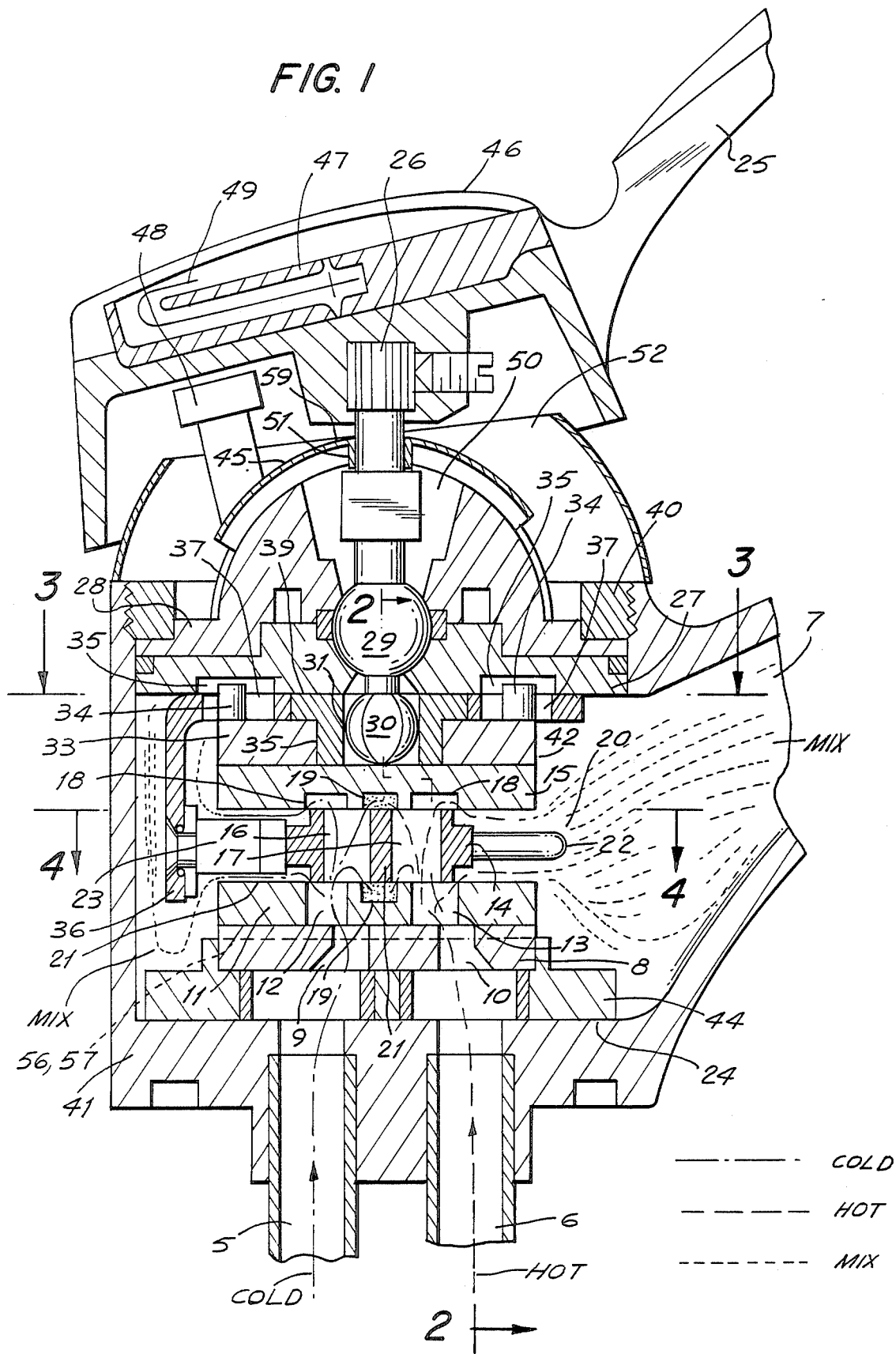

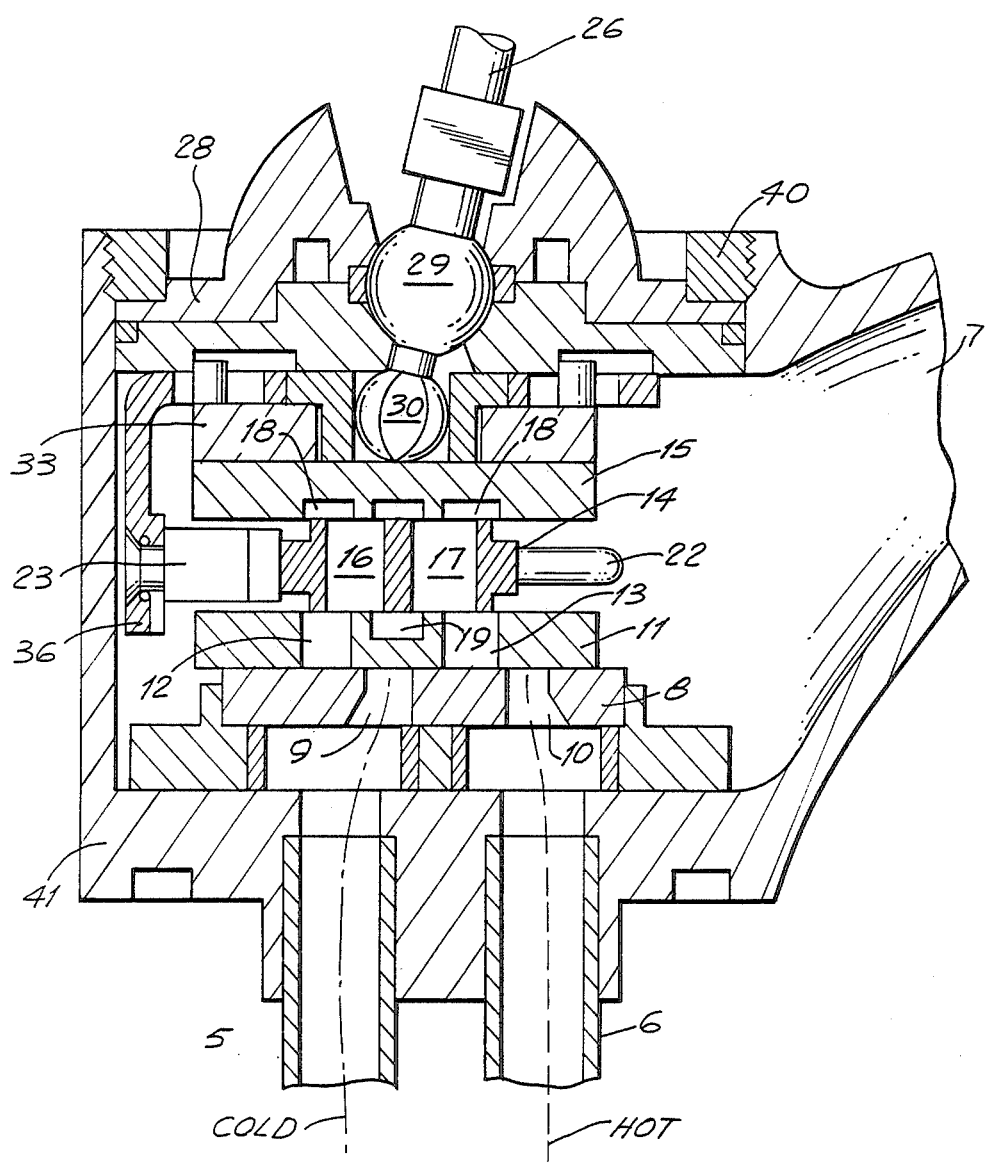
FIG IA

MIXING VALVE ASSEMBLY

BACKGROUND OF THE DISCLOSURE

1. Field of the Invention

The invention relates to a mixing valve assembly, particularly the type having a single control assembly, including thermostatic control means. The valve assembly is provided with at least one cold water inlet and at least one hot water inlet and one mixed water outlet, valve control elements for shutting off water flow, and volume control being positioned upstream relative to the thermostatic control means. One control element is in the form of a stationary valve seat and has inlet ports for cold and hot water, the ports being connected to the cold and hot water inlets at one side and directed towards a movable disc at the other side. The movable disc is displaceable on the valve seat disc and contains passages communicating with the inlet ports of the valve seat.

2. Description of Prior Art

Assemblies of this type are known, e.g. from DT-OS 28 04 755. In this known assembly which, for example, forms the starting point for the invention, the adjusting mechanism for shutting off and volume control interacts with two closing elements, which are two superimposed control discs rotatable relative to one another and arranged in front at the inlet side of the mixer valve assembly, substantially coaxially with the main axis thereof, the adjusting mechanism including a sleeve which is coaxial with the main axis, rotatable about it and rotatably connected at one end to one of the control discs. In this mixing valve assembly, shut-off and volume control are effected by means of two ceramic control discs. Control elements of this type are widely used in mixing valve assemblies, particularly so-called single-lever assemblies.

Mixing valve assemblies with a thermostatic control offer the advantage that the temperature of the mixed water is controlled automatically in accordance with a preset value, independently of the flow pressures and flow temperatures.

The thermostat control in the known mixing valve assembly which, for example, the invention takes as its starting point, is of conventional construction. The internal water chambers of the thermostatic control are in the form of annular chambers extending between the casing of the assembly and control elements in sleeve and piston form provided therein, the control elements including the thermostatic element being coaxial with the main axis of the assembly and being arranged so that some are stationary, some rotatable and some movable longitudinally, with a plurality of O-rings, particularly dynamically loaded ones, interposed. In this known assembly, shut-off and volume control are functionally separated from the thermostatic control in the normal way. Two actuating members are provided for using the assembly, again in the usual way, one to preset the temperature of the mixed water and the other for shutting off and volume control.

Mixing valve assembles of this type are complex and expensive in construction and to manufacture. Their operating reliability over long periods leaves much to be desired. The overall dimensions of the known assembly are considerable. In addition, their complex and expensive technology makes then ill suited in practice for construction in the form of a single-piece thermostat with one handle. Assemblies with one handle are becoming increasingly popular, particularly those fitted with an actuating member in the form of a lever, such as disclosed in DT-AS No. 15 50 060. A single-lever, one piece thermostat using conventional technology for thermostatic control and for shut-off and volume control is disclosed in DT-OS No. 24 13 392.

SUMMARY OF THE INVENTION

Accordingly, a principal objective of the invention is to provide a mixing valve assembly of the above type which is simple in construction and easy to manufacture. It is another object of the invention to provide a mixing valve assembly wherein its overall dimensions are considerably smaller when compared with those of conventional non-thermostatic control mixing valve assemblies. A further object of the invention is to provide a single-handle, one-piece thermostatic mixing valve assembly with an actuating member in the form of a lever.

The sanitary mixing valve assembly according to the invention, which achieves the aim set out above, comprises a valve disc which is also a functional part of the thermostatic control and forms a functional and structional unit with it, the unit being displaceable on the valve seat for shut-off and volume control. In a preferred form, the valve disc of the mixing valve assembly communicates directly with the inner water paths of the thermostatic control means and, directly or indirectly, to form at least part of the bearing for the control element of the thermostatic control means.

BRIEF DESCRIPTION OF THE DRAWINGS

There are many ways in which the mixing valve assembly according to the invention can be constructed and modified. These are characterized and are explained, by way of example only, with reference to the accompanying drawings in which:

FIG. 1 is an elevational view, in section, through a two-piece mixing valve assembly in its open position, illustrating one form of the invention;

FIG. 1A is a view similar to FIG. 1, but in its closed position;

DETAILED DESCRIPTION OF THE PREFERRED EMBODIMENTS

Figure 2:
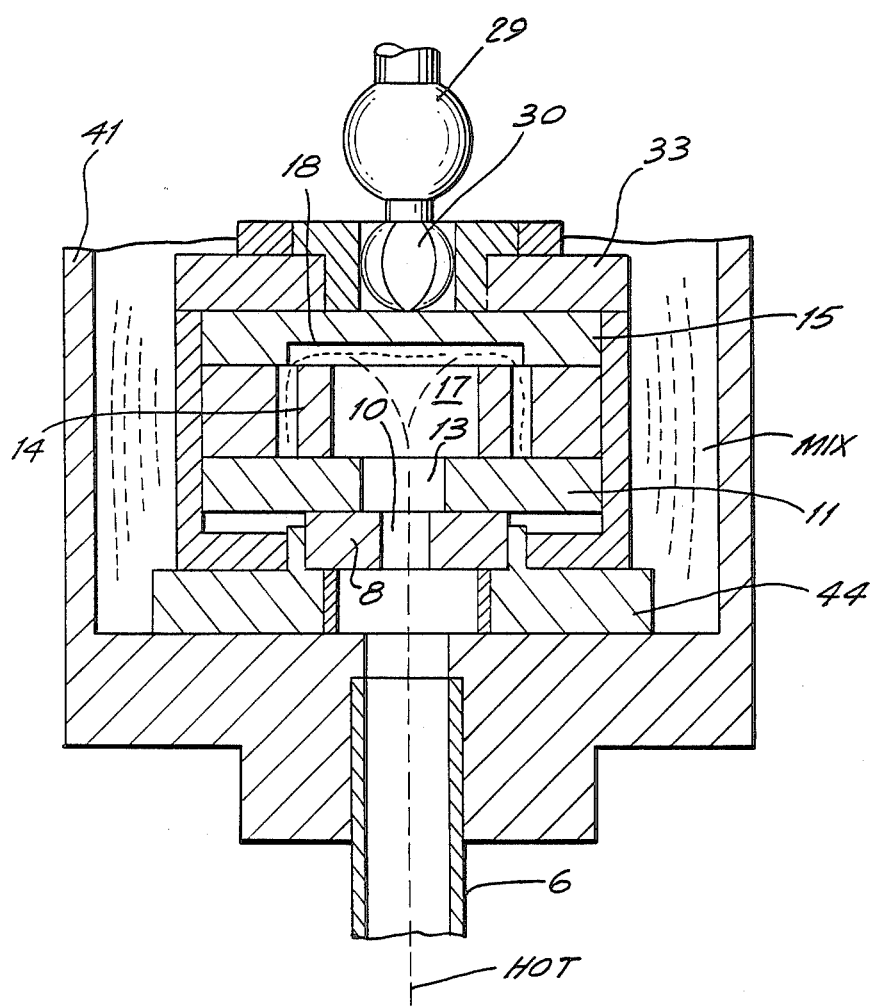
FIG. 2 is a fragmentary elevational view, in section, taken along the line 2—2 of FIG. 1.
Figure 3:
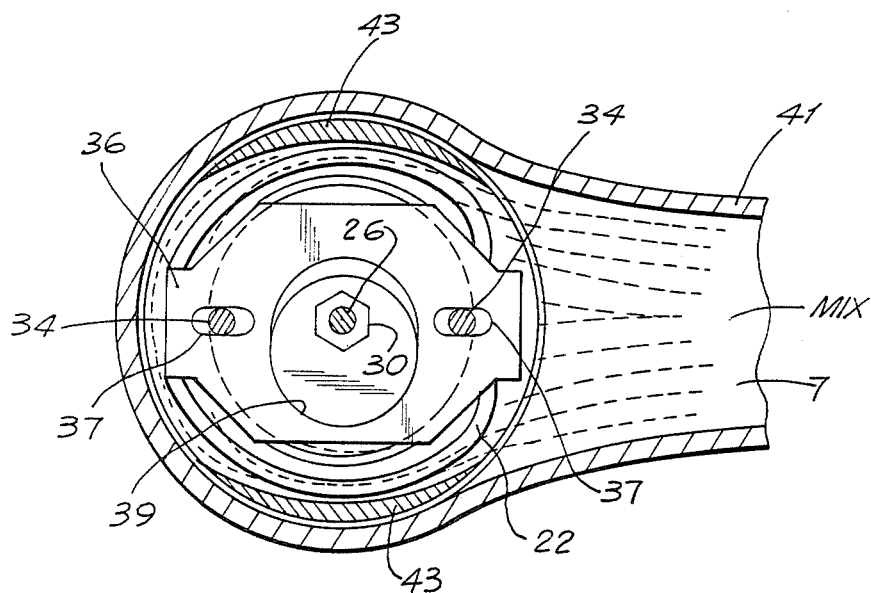
FIG. 3 is an elevational view, in section, taken along the line 3—3 of FIG. 1.
Figure 4:
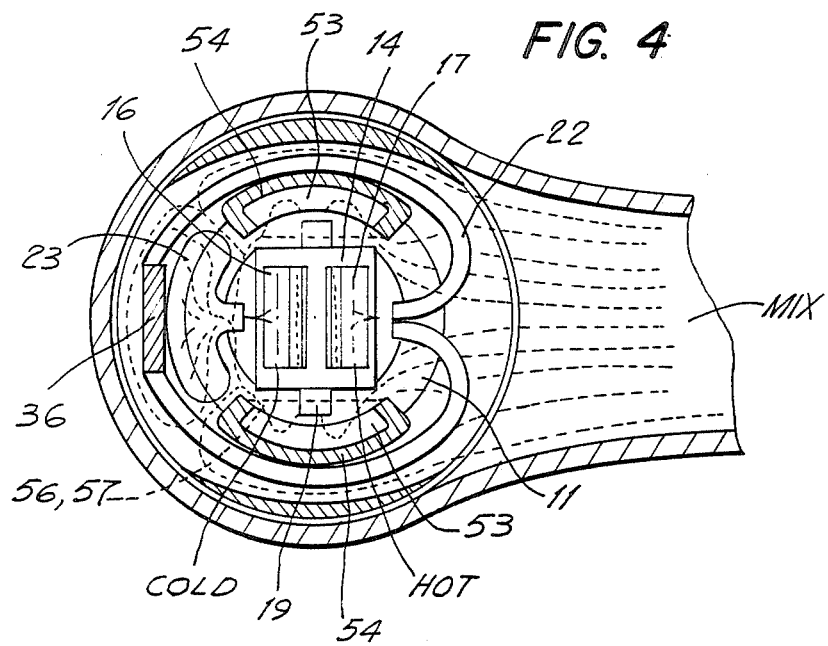
FIG. 4 is an elevational view, in section, taken along the line 4—4 of FIG. 1.
Figure 5:
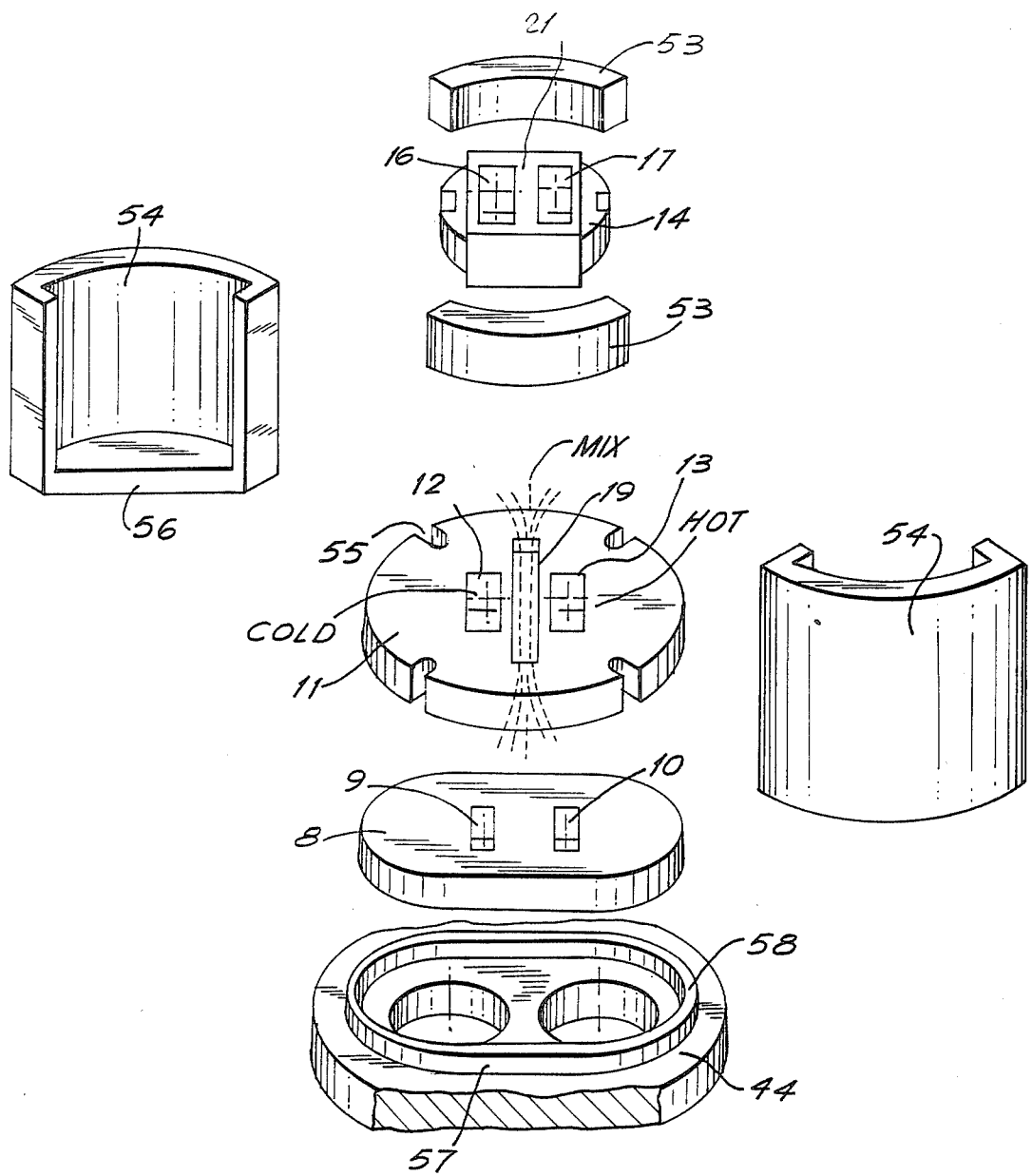
FIG. 5 is an exploded isometric view of the valving mechanism, shown in assembly in FIG. 1.
Figure 6:
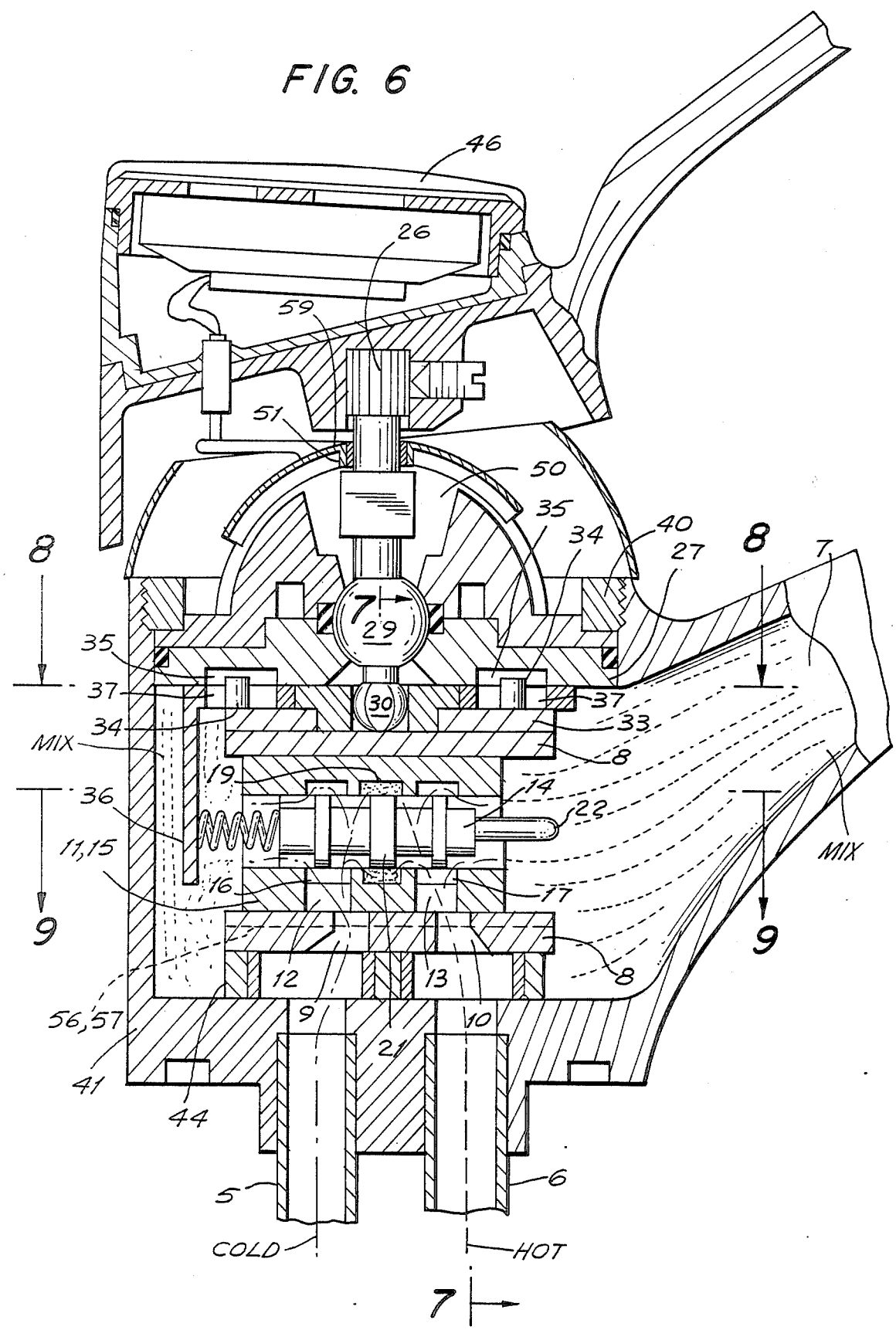
FIG. 6 is a view similar to FIG. 1, illustrating another form of the invention but of a single piece construction, in its open position.
Figure 6A:
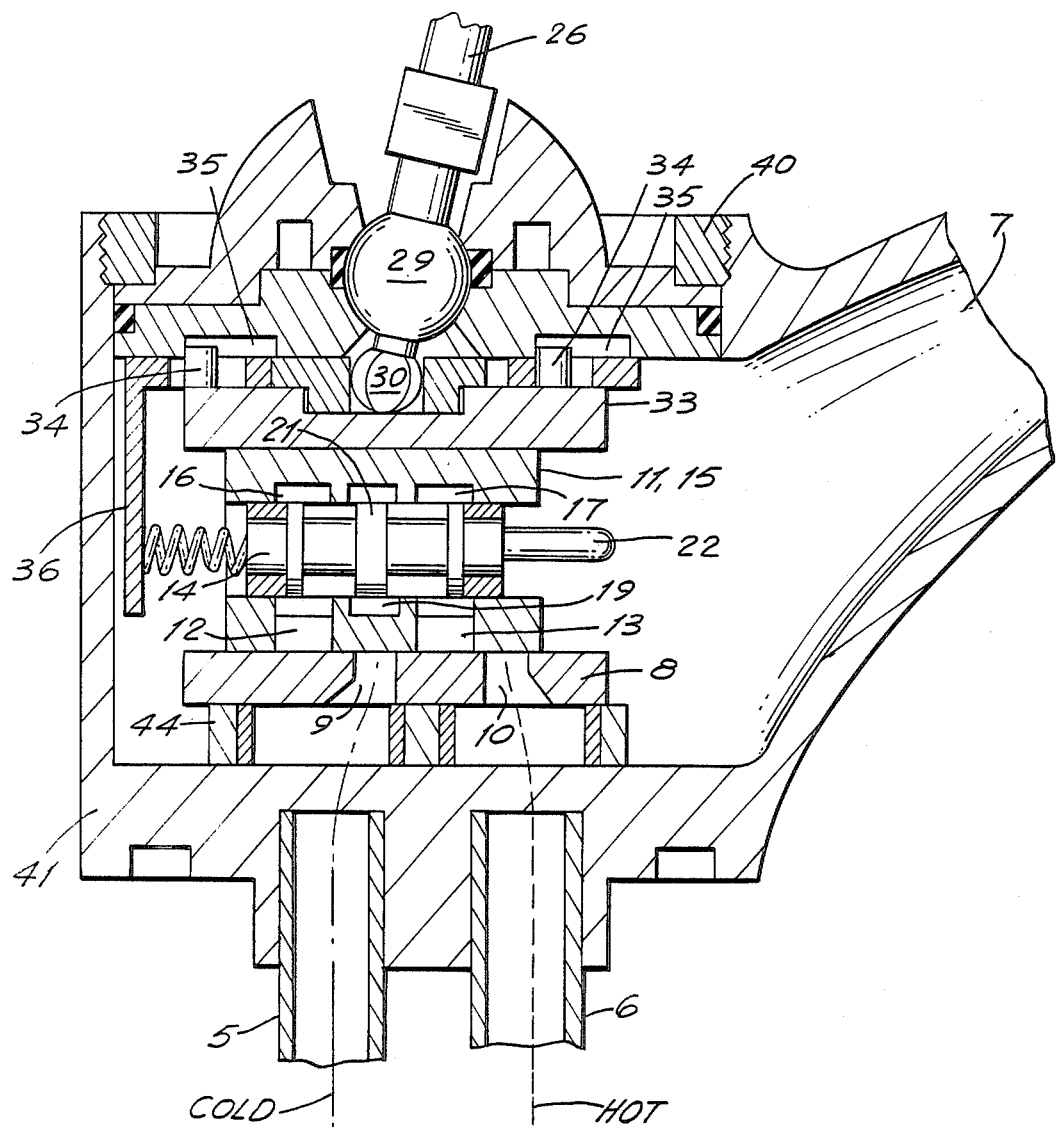
FIG. 6A is a view similar to FIG. 6, but in its closed position.
Figure 7:
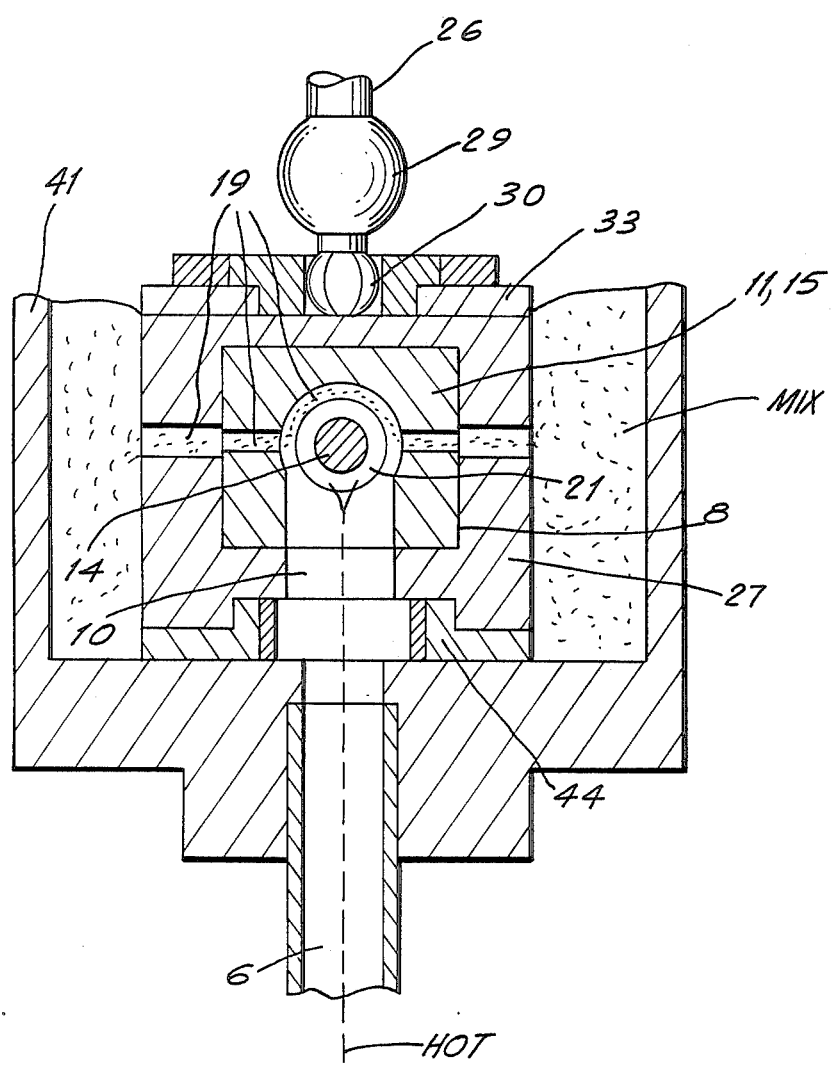
FIG. 7 is an elevational view, in section, taken along the line 7—7 of FIG. 6.
Figure 8:
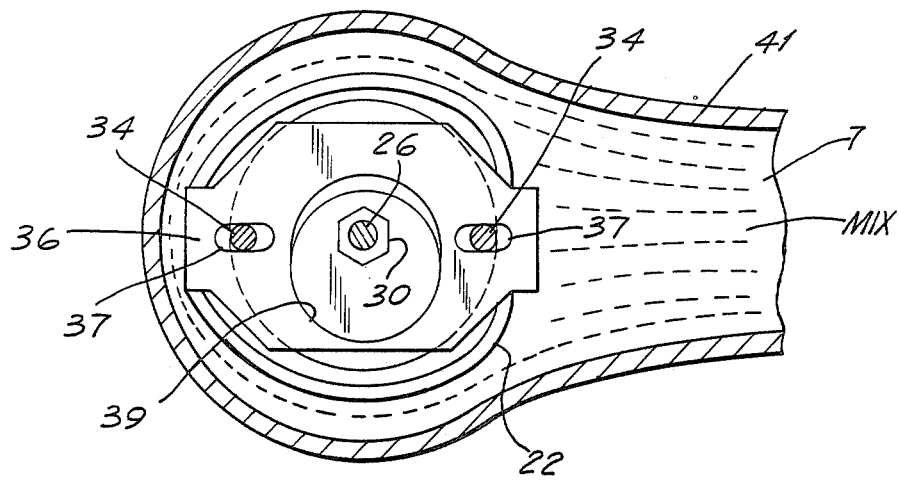
FIG. 8 is an elevational view in section, taken along the line 8—8 of FIG. 6.
Figure 9:
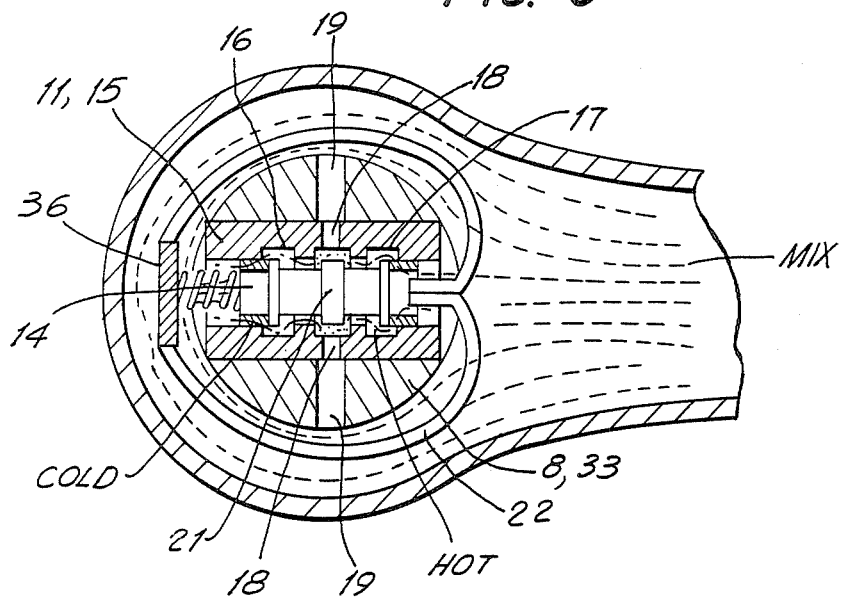
FIG. 9 is an elevational view, in section, taken along the line 9—9 of FIG. 6.
Figure 10:
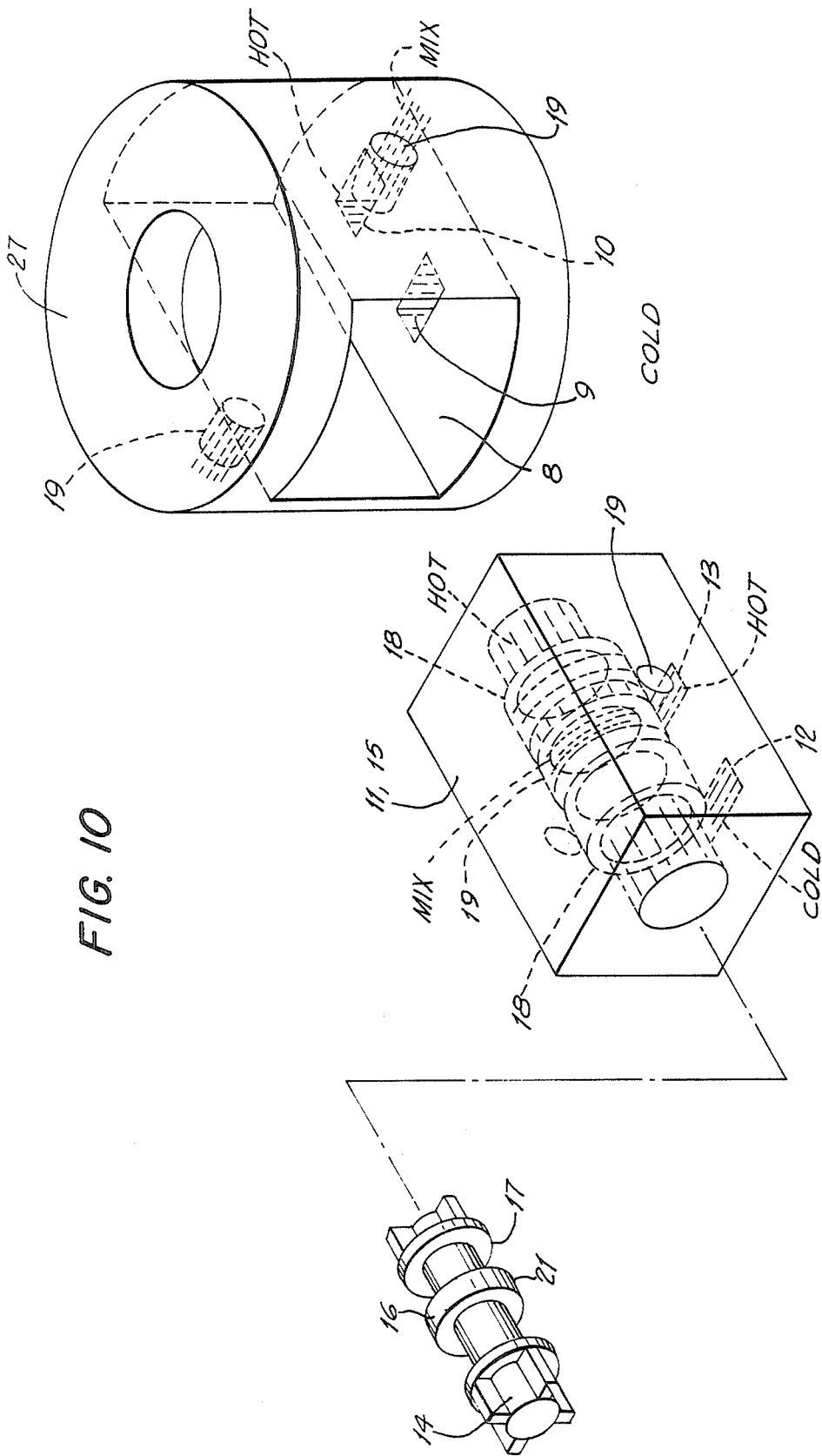
FIG. 10 is an exploded isometric view of the valving mechanism, shown in assembly in FIG. 6.

The lavatory mixing valve assembly, shown in FIGS. 1-5, is a thermostatically controlled mixing valve having a single handle as a shut-off and volume control. Mixing valve assembly 1 is provided with a cold water inlet 5, a hot water inlet 6 and a mixed water outlet 7. Upstream of the thermostatic control means are control elements 8, 11 for shut-off and volume control. Element 11 is a stationary valve seat disc and has inlet ports 9, 10 for the cold and hot water. The ports are connected to cold and hot water inlets 5, 6 at one side and are directed towards a second disc 11 at their other ends. Disc 11 is a movable valve disc, is displaceable on valve seat disc 8, and includes passages 12, 13 which communicate with inlet ports 9, 10 of valve seat disc 8. Disc 11 acts as a lower guide disc for a control element 14, which is also in the form of a disc. Control disc 14 is displaceable between lower guide disc 11 and upper guide disc 15. Upper guide disc 15 and contains passages 16, 17 for cold and hot water. Passages 16, 17 communicate with passages 12, 13 in lower guide disc 11 at one side and with apertures 18 provided in the upper guide disc 15 at the other. The cross sections of cavities 18 are designed to match those of passages 12, 13 in lower disc 11. Apertures 18 form the pressure compensating chambers for fractional quantities of the cold and warm water, which flows into a water chamber 20 from passages 12, 13 in lower disc 11, apertures 18 in upper disc 15 and one additional cavity 19, each in lower and upper guide discs 11, 15. In the example illustrated, cavities 18, 19 form discharge chambers connected to water chamber 20. Cavity 19 interacts with a web 21 separating passages 16, 17 through control disc 14, and is greater in length than the diameter of disc 14. Alternatively, cavity 19 could be recesses extending across disc 14. Designs with no cavities, or only isolated ones connected to water chamber 20, are also possible. In this case, the cavities not connected to chamber 20, would form pressure compensated or pressure compensating chambers, which would be shorter than the diameter of control disc 14. Thus, it would be possible to use only some of the possible water paths, while maintaining the hydrostatic balance. One possibility is to provide only one cold and hot water path connected to chamber 20 in the thermostatic control and, for example, only one or two correspondingly dimensioned pressure compensating chambers in the form of one or two cavities. Both this construction, and constructions with the cavities in the form of recesses extending across disc 14, would require less space.

In water chamber 20, there is an arcuate thermo-element 22, in the form of a bimetallic strip, engaging one end of control disc 14; the other end of disc 14 is loaded in the direction of thermo element 22 by a restoring spring 23. Springs of this type are necessary whenever the thermo-element is not fixed to the control element. Springs are also necessary whenever the control element interacts with valve seats in the form of stationary stops, as is the case with control elements in the form of sleeves or pistons. In this event, the springs act as lift springs. This means that, in the present invention, a lift spring can be dispensed with in all cases, and restoring spring 23 can, when thermo-element 22 is fixed to one end of control element 14. In previously known mixing valve assemblies with a thermostatic control, it is often necessary to have at least two springs.

Restoring spring 23, together with control disc 14, thermo-element 22 and two guide discs 11, 15, form a functional and structural unit, which is displaceable on valve seat disc 8 for shut-off and volume control purposes. Thus, valve disc or lower disc 11 is, at the same time, a functional part of the thermostatic control unit. It communicates directly with the internal water paths of the thermostatic control and also acts as a lower bearing for control disc 14; disc 14 moves parallel with the movement of the valve disc and also forms part of the casing of the thermostatic control.

The thermostatic control and the shut-off mechanism and volume control are brought together, i.e., mounted in a cartridge. The cartridge is interchangeably mounted in the mixing valve assembly, and is positioned inside a casing 24 which surrounds thermo-element 22.

The mixing valve assembly shown, is of the single handle type having an actuating member 24 in the form of a lever, which can be rotated and tipped, i.e., shifted vertically, and which is coupled a control lever 26. Thermostatic control and the presetting of the temperature of the mixed water can be effected by the rotating movement of actuating member 25, via control lever 26, and the shut-off action and volume control by the tipping movement.

Control lever 26 is mounted in a cover C which tightly seals mixing valve assembly 1, and comprises an upper and a lower portion 28 and 27, respectively. The central part of the lever has a ball element 29 as a bearing, while bottom end 30 is mounted in a bush 31 held rotatably in a hole 32 in a supporting plate 33. Plate 33 contacts cover C, which is moved in a straight line relative to cover C. Plate 33 is fixed to the thermostatic control, which includes valve disc or lower guide disc 11, and which forms a functional and structural unit. Lower end 30 of control lever 26 is hexagonal in normal axial section. Alternatively, it could be cylindrical.

Supporting plate 33 is guided by projections 34 in elongated recess 35 in lower portion 27 of cover C, which is in contact with a yoke 36 and engages plate 33. The yoke can be moved in a straight line and is guided by means of slots 37 giving passage to projections 34, and a central hole 38 to receive a flange 39 of bush 31, held between supporting plate 33 and cover C. Flange 39 is eccentric relative to the longitudinal axis of bush 31. It forms a circular cam, enabling yoke 36 to be displaced relative to valve disc 11. Yoke 36 engages control element or disc 14 via thermo-element 22 and restoring spring 23. Element 22 and spring 23 are fixed to one end of yoke 36.

The thermostatic control, shut-off action and volume control, accordingly, take place in a straight line along parallel axes of movement.

Cover C also forms a component of casing 24, which is in the form of a plastic cartridge and is fixed in body 41 of mixing assembly 1 by a threaded ring 40. Casing 24 includes a sleeve 43 which contains passages 42 for water and is welded both to cover C and to a base 44.

Control disc 14, its bearings 11, 15 and valve seat disc 8 are made of a ceramic material, preferably aluminum oxide. The surfaces facing towards one another are polished and provide a watertight seal between adjacent faces. A thermoplastic or duroplastic synthetic material with a high proportion of mineral filler could equally be used for these parts. A plastic material of this type is glass hard, non-shrinking, calcium repellent and non-swelling. The surfaces of control disc 14, bearing 11, 15 and disc 8 facing towards one another could further be coated with a plastic material, preferably polytetrafluoroethylene.

To prevent dirt from getting into bearing 29 of control lever 26 and from there into the assembly, the part of lever 26 above cover C extends through a cap 45, which tightly encloses lever 26, covers its bearing 29 and can be tipped together with lever 26. There is no risk of soiling, which might impair operation of the thermostatic control, since sudden changes in temperature with corresponding adjustments of control disc 14 produce much larger control gaps, so that even quite large dirt particles can be flushed out. There is a temperature scale 47 on the actuating member 25 below a cap-shaped transparent cover 46. The scale can be turned with actuating member 25, below an indicator 49 which acts as an opposed marker, and is held in position by a dry magnet 48. Magnet 48 may be mounted to cover C, although it is preferably mounted to cap 45, as shown. Cap 45 is, in turn, integral with a bush 52 surrounding the top of lever 26, is mounted non-rotatably and can be tipped with control lever 26 as far as hole 50 extends laterally. In the example illustrated, a guide rib 59 is provided on cap 45 and engages in a guide groove 60 in cover C, to mount bush 51, and thus cap 45 is non-rotatable.

Figure 11:
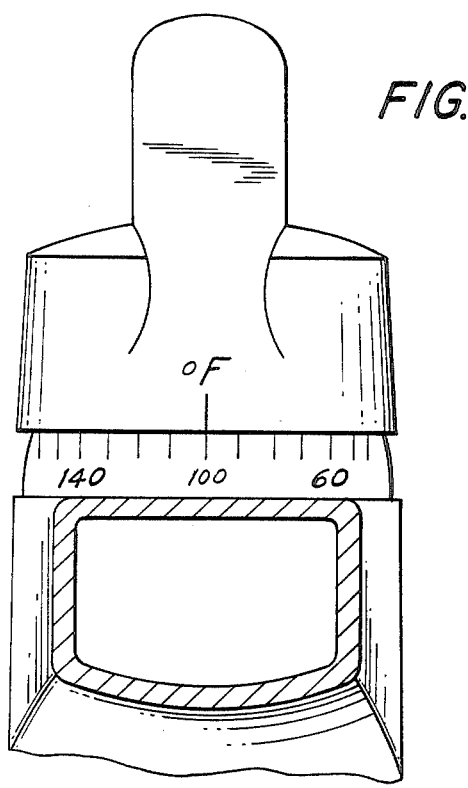
FIGS. 11, 12 and 13 are fragmentary plan views illustrating various positions for mounting the temperature display indicia for a mixing valve assembly.
Figure 12:
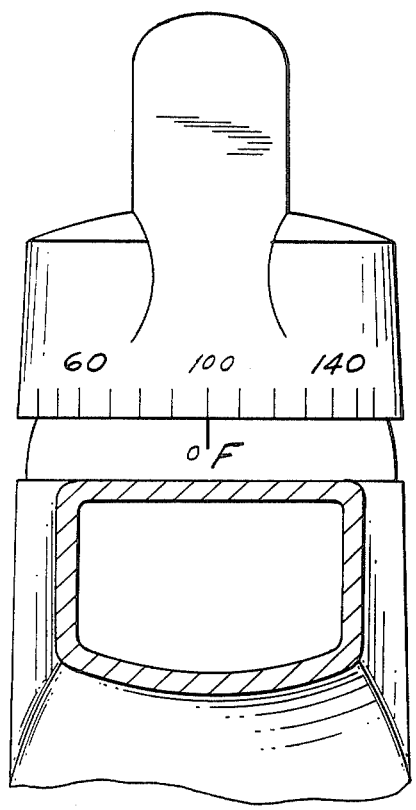
Figure 13:
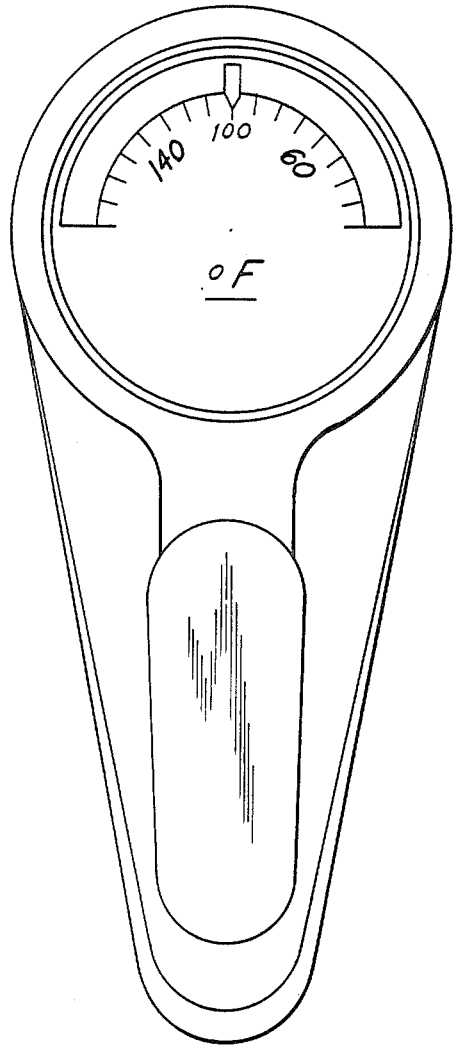

The temperature scale 47, as illustrated in FIGS. 11-13, may alternatively be on the body of mixing assembly 41 or on a rosette-type cover 52, provided between body 41 and actuating member 25, which could carry the opposed markings. Naturally, the scale could be on actuating member 25 and the opposed markings on body 41 or rosette cover 52.

There could be an electronic display on actuating member 25, to convert the angular position of member 25 to a nominal temperature, and display it digitally.

As already mentioned, the construction described and illustrated is by way of an example of the invention. The invention is not restricted to this, and there are other possibilities in the framework of the basic inventive idea, particularly with respect to the shape and arrangement of the various parts. In this connection, it should first be made clear that the invention may be applied to a wide variety of different types of sanitary mixing valve assemblies, i.e. including kitchen assemblies, bidet assemblies, bath filling and shower assemblies, in flush and surface-mounted arrangements. Control element 14 could be in piston form, and valve disc 11 integral with upper guide disc 15 and distance pieces 53. In the example shown, distance pieces 53 are held in their position between lower and upper guide discs 11, 15 by plastic clips 54, which also act as aids to assembly, and engage in apertures 55 in lower and upper guide discs 11, 15. Clips 54 engage through apertures 55 in upper disc 15 and are fixed to supporting plate 33 by welding. They further engage through apertures 55 in lower guide disc or valve disc 11, and have straight guiding surfaces 56 at the bottom for the function and structural unit and the shut-off mechanism and volume control; the guiding surfaces 56 interacting with corresponding guiding surfaces 57 on bottom 58 of cartridge-like casing 24. Surfaces 57 are formed on a peripheral rib 58, tightly enclosing valve seat 8, and also preventing it from turning. Surfaces 56, 57 may be part of a dovetail guide.

While the invention is shown in the form of a mixing valve assembly, it is not restricted to the sanitary field. Also, the invention could obviously be in the form of a mixing valve assembly with two handles.

It is claimed:

1. A sanitary mixing valve assembly comprising: a valve body having operably mounted therein, thermostatic and valving means, of unitary design, to control both the temperature of water flow and volume through said valve assembly, said valving means operably coupled to at least one cold and hot water inlet and one mixed water outlet, said valving means, disposed upstream of said thermostatic means, includes control elements for regulating the relative rates of flow of cold and hot water and mixed water discharge, one of said control elements, in the form of a stationary disc, includes cold and hot water inlet ports coupled between corresponding cold and hot water ports formed in said valve body, and a movable disc slidably mounted in watertight, sealing engagement with said stationary disc; said movable disc having passages in fluid communication with said inlet ports in said stationary disc and is operably coupled to said thermostatic control means so that said thermostatic control means and said movable disc are shiftable between their opened and closed positions to regulate both water temperature discharge and volume flow; said movable disc providing lower guide means for said control element which is in the form of a control disc, and is shiftable between said movable disc and an upper guide disc, said control disc having passages for cold and hot water; said passages communicating with the passages in movable disc at one side and with cavities formed in said upper guide disc on the other side, said cavities of said upper guide disc are formed having corresponding cross-sectional areas to those cross-sectional areas of said passages in said movable disc; said cavities forming pressure compensating chambers for partial quantities of the hot and cold water, which flows into a water chamber from the passages in said movable disc; a thermo-element is positioned in the water chamber with water flowing around it and is coupled to one end of said control disc, while the other end of said disc is loaded in the direction of said thermo-element by a restoring ring in the form of a spring, together with said control disc, said thermo-element, said movable disc and said upper guide disc forming said thermostatic means which is shiftable over said stationary valve seat disc by an actuating member and said control disc which, together with said thermo-element and restoring spring, is shiftable relative to said movable upper guide disc by said actuating member to regulate volume of water flow and said water temperature discharge.

2. The assembly of claim 1, wherein said movable valve disc communicates directly with water passages of said thermostatic control means.

3. The assembly of claim 1, wherein said passages in said control disc are separated by at least one web which interacts with said pressure compensated chambers of said upper guide disc for regulating fractional quantities of the hot and cold water.

4. The assembly of claim 3, wherein said pressure compensating chambers are connected to said water chamber to form at least a discharge chamber.

5. The assembly of claim 1, wherein said control element is shiftable parallel with said movable valve disc.

6. The assembly of claim 1 wherein said thermostatic control means, shut-off and volume control are mounted in a cartridge which is removably mounted in said valve body.

7. The assembly of claim 1, wherein said thermostatic control means includes a control lever which is coupled to an actuating member; so that when said actuating member is rotated and tipped vertically between its opened and closed positions, both the water temperature and volume control can be regulated.

8. The assembly of claim 7, wherein said actuating member is in the form of a lever.

9. The assembly of claim 7, wherein said control lever is mounted through an aperture in a cover, said cover includes an upper and a lower element to provide a watertight seal with said valve body; a ball element is formed in the central portion of said control lever to provide bearing means, while the lower end of said control lever is disposed in a bushing mounted in an aperture of a shiftable supporting plate, which is operably coupled to said cover and said supporting plate mounted to said thermostatic means.

10. The assembly of claim 9 wherein said supporting plate is guided by projections formed in elongated apertures in said cover; a yoke is mounted to said supporting plate and is displaceable in a straight line, and is guided by slots formed between said projections on said supporting plate; said supporting plate having a central opening to receive a flange of said bushing, said flange being held between said supporting plate and said cover, which is arranged eccentrically relative to the longitudinal axis of said bushing to form a circular cam, by means of which, said yoke is displaceable relative to said movable valve disc, so that said yoke engages said control element by means of said thermo-element and said restoring spring.

11. The assembly of claim 1, wherein said cover is a component of said cartridge casing.

12. The assembly of claim 11, wherein said cartridge casing is mounted in said valve body of said mixing valve assembly by means of a threaded ring.

13. The assembly of claim 11, wherein said cartridged casing includes a sleeve having passages for water flow, and said sleeved is connected both to the lower part of said cover and to a base.

14. The assembly of claim 13, wherein said cartridge casing is made of plastic is welded together.

15. The assembly of claim 1, wherein said thermo-element is disposed at least in partial surrounding relation within said cartridge casing.

16. The assembly of claim 1, wherein said control element, said bearings and said stationary valve seat are made of a ceramic material.

17. The assembly of claim 16, wherein said control element, said valve discs and said stationary valve seat are made of aluminum oxide.

18. The assembly of claim 1, wherein said control element, said valve discs and said stationary valve seat are made of thermoplastic.

19. The assembly of claim 1 includes a temperature assembly, said assembly including a scale positioned below a cap-shaped transparent cover mounted on said actuating member, said scale being rotatable to provide an opposing marking, said indicator being held in position by a dry magnet mounted on said valve body.

20. The assembly of claim 19, wherein said dry magnet is mounted to said cover.

21. The assembly of claim 19, wherein a bushing, on which is mounted said dry magnet, is mounted to the upper parts of said control lever, said dry magnet and said bushing being non-rotatable with respect to said cover, and is shiftable with said control lever.

22. A sanitary mixing valve assembly comprising: a valve body having operably mounted therein, thermostatic and valving means, of unitary design, to control both the temperature of water flow and volume through said valve assembly, said valving means operably coupled to at least one cold and hot water inlet and one mixed water outlet, said valving means, disposed upstream of said thermostatic means, includes control elements for regulating the relative rates of flow of cold and hot water and mixed water discharge, one of said control elements, in the form of a stationary disc, includes cold and hot water inlet ports coupled between corresponding cold and hot water ports formed in said valve body, and a movable disc slidably mounted in watertight, sealing engagement with said stationary disc; said movable disc having passages in fluid communication with said inlet ports in said stationary disc and is operably coupled to said thermostatic means; said thermostatic means including a shiftable disc disposed between an upper guide disc and said movable disc; said shiftable disc having cold and hot water passages communicating with said hot and cold water passages of said movable disc at one side and, on the other side, with cavities formed in said upper guide disc to form pressure compensating chambers for partial quantities of hot and cold water to flow to a temperature sensing means so that said thermostatic control means and said movable disc are shiftable between their opened and closed positions to regulate both water temperature discharge and volume flow.

* * * * *